(No Model.)  W. H. KENNER.  2 Sheets—Sheet 1.
BALING PRESS.
No. 491,967.  Patented Feb. 14, 1893.
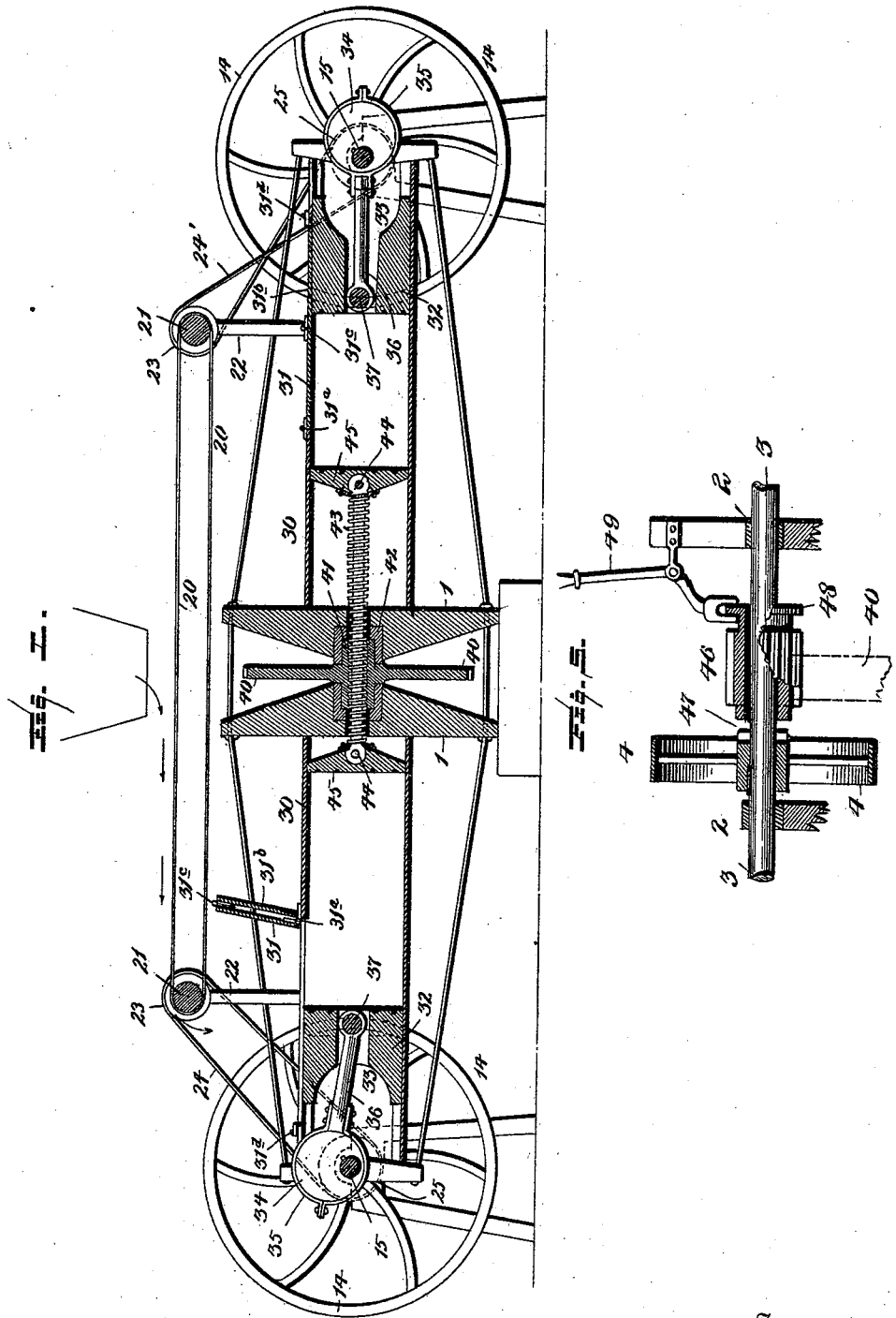
Witnesses:
L. C. Hills
D. E. Squires
Inventor,
William H. Kenner,
By Collamer & Co.,
Attorneys

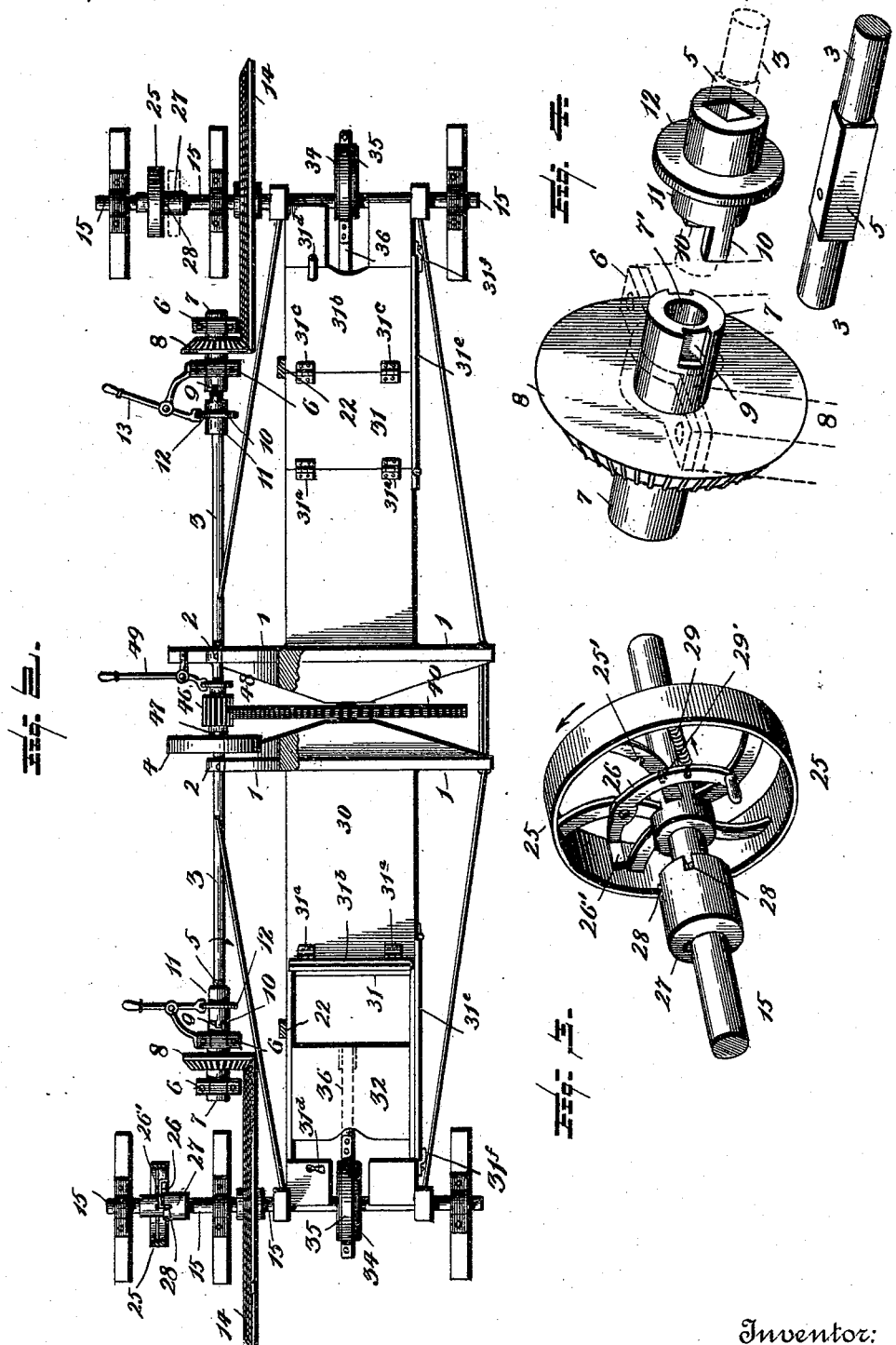

UNITED STATES PATENT OFFICE.

WILLIAM HOUSENTON KENNER, OF DUNDEE, TEXAS.

BALING-PRESS.

SPECIFICATION forming part of Letters Patent No. 491,967, dated February 14, 1893.

Application filed May 18, 1892. Serial No. 433,446. (No model.)

*To all whom it may concern:*

Be it known that I, WILLIAM HOUSENTON KENNER, a citizen of the United States, residing at Dundee, in the county of Archer and State of Texas, have invented certain new and useful Improvements in Baling-Presses; and I do hereby declare the following to be a full, clear, and exact description of the invention, such as will enable others skilled in the art to which it appertains to make and use the same.

This invention relates to presses, and more especially to that class thereof known as screw baling presses: and the object of the same is to produce a double-acting baling press of this character capable of exerting pressure from two directions and operated by two independent mechanisms.

To this end the invention consists in the following parts, constructed substantially as hereinafter more fully described and claimed, and as illustrated on the accompanying two sheets of drawings wherein—

Figure 1 is a central longitudinal section of this improved baling press. Fig. 2 is a plan view thereof omitting the feeding apron. Fig. 3 is a perspective detail of the fast and loose pulleys for one of the end shafts, showing the parts slightly separated. Fig. 4 is a perspective detail of one of the double bearings and the clutch at its end of the main shaft. Fig. 5 is an enlarged sectional detail of the clutch and power wheel on the main shaft.

Referring to the said drawings, 1 is the frame-work suitably braced and strengthened and of any preferred construction not material to the operation of the machine. Journaled in boxes 2 supported by this framework is the main driving shaft 3 having keyed thereon a power wheel 4 and being squared as at 5 for a short distance near its extremities. Adjacent each end thereof is a double bearing 6 wherein are journaled the ends 7 of the hub of a pinion 8. The inner end of each hub is socketed as at 7' to afford a journal for the extremity of the driving shaft, and is also socketed as at 9 to receive tongues 10 of a clutch 11 which slides on said squared portion 5 of the power shaft 3, this clutch having an annular flange 12 which is engaged by a lever 13 whereby it may be moved into or out of engagement with the socketed hub of the pinion. The teeth of the latter mesh with teeth in a large gear wheel 14 which is secured on the shaft 15, one of said shafts being mounted in suitable bearings across each end of the main frame.

The feed mechanism comprises an endless apron 20 moving over rollers 21 supported in uprights 22 from the frame; and on each roller is a pulley 23 connected by a belt 24 with a loose pulley 25 mounted on one of the shafts 15, and one of these belts 24' is crossed. Each pulley 25 has pivoted to one of its spokes a lever 26 one arm of which is normally drawn outward by a spring 29, and the other arm of which carries a dog 26'. Adjacent this loose pulley is a fixed pulley 27 also mounted on the shaft 15 and having notches 28 which may engage the dog of said lever. The latter has a pin 29' adapted to engage a recess 25' in one of the spokes, when it is desired to hold the dog positively out of engagement with one of the notches—all as seen in Fig. 3. By this construction it will be seen that when the main shaft rotates in the direction of the arrow, it drives the gear wheels 14 on the end shafts 15 in opposite directions to each other, and according to whichever one of these gear wheels is disengaged from the power shaft by the lever 13, so that the other gear wheel through its shaft and the fast and loose pulleys will cause the endless apron 20 to move. If the gear wheels are reversely connected with and disconnected from the power shaft, the apron will still move in the same direction; but when the direction of the rotation of the power shaft is changed, the feed of the apron will of course be reversed.

The main framework 1 supports two similar boxes 30, each of which has a feed door in its upper side near the end of the feed apron for the reception of the hay and the removal of the bale. This door is composed of an inner leaf 31 hinged at 31$^a$ to the top of the box, and an outer leaf 31$^b$ hinged at 31$^c$ to the outer edge of the inner leaf and adapted to be locked in closed position by a catch 31$^d$. In the side of the box opposite the main shaft is another door 31$^e$ for the finished bale to pass out, and this door is held closed by a catch 31$^f$, as seen in Fig. 2. In the outer end of each box slides the packing block 32 having a dished outer face 33; and keyed on the end axle 15 is an eccentric 34 whose encircling band 35 is connected with the pitman 36 which is pivoted at 37 to the block, the dished outer face 33 of said block receiving said eccentric and its band as will be clear. With this construction, the levers 13 are operated to cause the hay to be fed into one of the boxes 30 through its feed door, the packing block 32 therein being caused to reciprocate while the feeding takes place, whereas the other block 32 is then standing idle to permit the formation of the bale in the opposite box.

In connection with the above mechanism I also provide a large gear 40 whose hub 41 is journaled in the boxes 42 at the center of the framework between the press boxes 30 and is interiorly screw-threaded, and through this thread moves a screw 43 whose ends are secured as at 44 to two press blocks or plungers 45 which also move within the boxes 30. Mounted loosely on the power shaft 3 is a long pinion 46 having at one end a clutch 47 adapted to connect with the power wheel 4, and at the other end a ring 48 engaged by a lever 49 whereby it may be thrown into or out of connection with the power wheel. It will be readily understood that when this pinion is connected with and rotated by the power wheel 4, the power gear 40 will be caused to turn and the screw 43 thereby moved longitudinally in the proper direction to cause its plunger 45 to press the hay into bales. This action takes place while the packing block is standing idle as seen at the right of Fig. 1, the other block then packing the hay in the opposite box ready to be operated upon; and to effect the baling of this hay, the power shaft is reversed in the direction of its rotation by any suitable means, as by reversing the engine or horse-power.

The operation is as follows: The parts being in the position shown in Fig. 1, the apron 20 is feeding to the left into the left box 30 whose door 31$^b$ is open as shown, and the packing block in this box is packing the hay into the box toward the then receding plunger 45. The other packing block 32 is stationary and the other plunger 45 is moving outwardly to form the bale, the doors in this box 30 being closed. When the bale is formed the side door 31$^c$ is opened, the bale wired in the usual manner, and the door sections 31 and 31$^b$ loosened. The sections of the left box are then closed, the power shaft reversed in the direction of its rotation, the left shaft 15 caused to stand idle by disengaging the left clutch, and the screw 43 and its plungers begin to move toward the left. The finished bale is then drawn out, the right end shaft 15 connected with the power shaft by its clutch, and the door section 31$^b$ of the right box opened; and the apron 20 thereafter feeds into the box while the bale is being pressed in the left in the same manner. Obviously while one end shaft is driving the apron through its belt 24 or 24′ the opposite belt turns the loose pulley idly on its end shaft.

If the feed is too fast, it can at any time be stopped; if too slow, the power gear 40 can at any time be stopped by disconnecting the central clutch, and the plungers stand idle until enough hay has been fed. The relative sizes, shapes, and proportions of parts, as well as their materials and their exact construction are not necessarily those herein shown and described; as considerable change can be made without departing from the spirit of my invention.

What is claimed as new is—

1. In a baling press, the combination with the press box, a reciprocating plunger therein, and a reciprocating packing block also therein; of a power shaft, two independent gears thereon and connected thereto by clutches, and independent connections substantially as described between one of the gears and the plunger, and the other gear and the packing block, whereby the plunger and block may be caused to move at will, as and for the purpose set forth.

2. In a baling press, the combination with the press box, a plunger therein, and means for moving it at will; of a packing block, a shaft having an eccentric, a pitman pivoted at one end to said block and having at its other end a band encircling said eccentric, a gear wheel on said shaft, and means for driving this gear at will and independently of the plunger, as and for the purpose set forth.

3. In a baling press, the combination with the press box, a plunger therein, a screw secured to the plunger, a power gear having a threaded hub through which the screw passes, and means for driving this gear in either direction at will; of a packing block, a shaft having an eccentric, a pitman pivoted at one end to said block and having at its other end a band encircling said eccentric, a gear wheel on said shaft, and means for driving this gear at will and independently of the plunger, as and for the purpose set forth.

4. In a baling press, the combination with a double press box, a power gear standing across its center and having an interiorly threaded hub, a screw through said hub, and plungers secured to the ends of said screw; of packing blocks in said box, transverse shafts across the ends of the box, eccentrics thereon, pitmen connecting the eccentrics with the packing blocks, the latter having dished outer faces to receive the eccentrics, gear wheels on these shafts, small gear pinions meshing with said three gears, and clutches substantially as described for independently connecting said small gears with the power shaft at will, as and for the purpose described.

5. In a baling press, the combination with a double press box, a power gear standing across its center and having an interiorly threaded hub, a screw through said hub, and plungers secured to the ends of said screw; of packing blocks in said box, transverse shafts across the ends of the box, eccentrics thereon, pitmen connecting the eccentrics with the packing blocks, the latter having dished outer faces to receive the eccentrics, gear wheels on these shafts, small gear pinions meshing with said three gears, clutches substantially as described for independently connecting said small gears with the power shaft at will, an endless apron adapted to feed into either end of the press box, and connections between the rollers of this apron and said transverse shafts, as and for the purpose set forth.

6. In a baling press, the combination with a double press box, a power gear standing across its center and having an interiorly threaded hub, a screw through said hub, and plungers secured to the ends of said screw; of packing blocks in said box, transverse shafts across the ends of the box, eccentrics thereon, pitmen connecting the eccentrics with the packing blocks, the latter having dished outer faces to receive the eccentrics, gear wheels on these shafts, small gear pinions meshing with said three gears, clutches substantially as described for independently connecting said small gears with the power shaft at will, an endless apron adapted to feed into either end of the press box, loose pulleys on said transverse shafts, means for causing them to turn with said shafts or not at will, and belts connecting these pulleys with the rollers of said apron, one of these belts being crossed, as and for the purpose set forth.

7. In a baling press, the combination with a double press box, a power gear standing across its center and having an interiorly threaded hub, a screw through said hub, and plungers secured to the ends of said screw; of packing blocks in said box, transverse shafts across the ends of the box, eccentrics thereon, pitmen connecting the eccentrics with the packing blocks, gear wheels on these shafts, small gear pinions meshing with said three gears, clutches substantially as described for independently connecting said small gears with the power shaft at will, and another clutch for connecting said power gear with this shaft at will, as and for the purpose set forth.

8. In a baling press, the combination with the press box having two doors in its upper side, the press blocks in said box, two packing blocks, shafts standing across the ends of said box, connections for driving each of said packing blocks from its shaft, and means substantially as described for rotating the shafts in opposite directions and at will; of an endless apron located above said box and adapted to deliver into either of said doors, and connections between said shafts and the rollers of the apron for moving the latter in either direction at will, as and for the purpose set forth.

In testimony whereof I affix my signature in presence of two witnesses.

WILLIAM HOUSENTON KENNER.

Witnesses:
M. J. BARNES,
BARBOUR BARNES.